US009394392B2

(12) United States Patent
Jorgensen

(10) Patent No.: US 9,394,392 B2
(45) Date of Patent: Jul. 19, 2016

(54) CONTROL OF RESIN MOLECULAR WEIGHT DISTRIBUTION USING MIXED CATALYST SYSTEMS

(75) Inventor: Robert J. Jorgensen, Scott Depot, WV (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 389 days.

(21) Appl. No.: 13/991,538

(22) PCT Filed: Dec. 22, 2011

(86) PCT No.: PCT/US2011/066743
§ 371 (c)(1),
(2), (4) Date: Aug. 22, 2013

(87) PCT Pub. No.: WO2012/092105
PCT Pub. Date: Jul. 5, 2012

(65) Prior Publication Data
US 2013/0338320 A1  Dec. 19, 2013

Related U.S. Application Data

(60) Provisional application No. 61/428,964, filed on Dec. 31, 2010.

(51) Int. Cl.
| C08F 210/00 | (2006.01) |
| C08F 210/14 | (2006.01) |
| C08F 10/00 | (2006.01) |
| C08F 10/02 | (2006.01) |
| C08F 2/00 | (2006.01) |
| C08F 210/16 | (2006.01) |

(52) U.S. Cl.
CPC .............. *C08F 210/14* (2013.01); *C08F 10/00* (2013.01); *C08F 10/02* (2013.01); *C08F 2/001* (2013.01); *C08F 210/16* (2013.01); *C08F 2410/03* (2013.01); *C08F 2410/04* (2013.01)

(58) Field of Classification Search
CPC .............. C08F 4/10; C08F 4/50; C08F 10/02; C08F 210/16
See application file for complete search history.

(56) References Cited

U.S. PATENT DOCUMENTS

| 4,302,566 A * | 11/1981 | Karol ................. C08F 210/16 526/124.6 |
| 4,543,389 A * | 9/1985 | Burstain ............... C08F 297/08 525/247 |
| 6,489,411 B1 | 12/2002 | Shamshoum et al. |
| 6,617,405 B1 * | 9/2003 | Jorgensen ............... C08F 10/02 502/104 |
| 6,780,808 B2 * | 8/2004 | Wagner ................... C07F 3/003 502/103 |
| 7,786,237 B2 * | 8/2010 | Barre ..................... C08F 10/00 502/103 |
| 2011/0166305 A1 * | 7/2011 | Jorgensen ............... C08F 10/00 526/124.5 |
| 2013/0137827 A1 * | 5/2013 | Jorgensen ................ C08F 2/34 525/240 |
| 2013/0324681 A1 * | 12/2013 | Jorgensen ............... C08F 10/00 526/65 |

OTHER PUBLICATIONS

PCT Search Report dated Mar. 8, 2013; from PCT counterpart Application No. PCT/US11/66743.
PCT International Preliminary Report on Patentability (IPRP) dated Jan. 2, 2013; from PCT counterpart Application No. PCT/US11/66743.
Chinese Office Action dated Nov. 26, 2014 for counterpart Chinese Application No. 201180065754.X, 1 page.
Response to Chinese Office Action dated Nov. 26, 2014 filed Apr. 10, 2015 for counterpart Chinese Application No. 201180065754.X, 4 pages.
EP Office Action dated Aug. 7, 2013; from EP counterpart Application No. 11808804.6.
Instructions to EP Office Action dated Jan. 14, 2014; from EP counterpart Application No. 11808804.6.
Response to EP Office Action dated Jan. 22, 2014; from EP counterpart Application No. 11808804.6.
Russia Office Action dated Feb. 7, 2014; from Russian counterpart Application No. 2013135707.
Japanese Office Action dated Nov. 7, 2015; from Japanese counterpart Application No. 2013-547564.

* cited by examiner

*Primary Examiner* — Rip A Lee

(57) ABSTRACT

A polymerization process including the use of a first Ziegler-Natta type procatalyst having no internal electron donor and a second Ziegler-Natta type procatalyst including an internal electron donor is provided.

11 Claims, 3 Drawing Sheets

CONTROL OF RESIN MOLECULAR WEIGHT DISTRIBUTION USING MIXED CATALYST SYSTEMS

FIELD OF INVENTION

The invention relates to a process for producing very high molecular weight olefin-based polymers in either a slurry polymerization system or in a gas phase polymerization system in condensed mode operation, very high molecular weight olefin-based polymers produced thereby and articles made from such polymers. More specifically, the invention relates to a process to control the molecular weight distribution of polymers produced with mixed metal Ziegler-Natta type catalysts in gas phase polymerization reactors, independent of catalyst composition changes.

BACKGROUND OF THE INVENTION

High molecular weight olefin-based resins, particularly resins with high molecular weight fractions of $>10^6$ g/mole in amounts greater than two weight percent, are desirable to produce articles with improved mechanical properties, such as those produced from HDPE blow molding resin, where resin swell is important. One of the most efficient processes for the production of ethylene polymers and copolymers is the gas phase fluidized bed process. In order to maximize efficiency and minimize operation costs of the system, it is best to run such process in what is known as "condensed" or "super-condensed" mode in which a large fraction of the recycle gas is condensed and recycled back into the reactor.

The capability to control molecular weight distribution ("MWD") of an olefin polymerization system is also desirable. Various techniques for modifying molecular weight distribution are known in the art. Manipulation of polymerization process variables, for example, allows for some change in molecular weight distribution. However economics (i.e., too low a reaction temperature results in poor throughput), physical factors (reaction temperature, for example, can be limiting if the polymer becomes soft or sticky) and process limitations (e.g., total pressure, monomer solubility in the polymer) limit the extent to which process variables may be manipulated. The ability to control polymer properties, such as MWD, using a component such as a co-fed catalyst or a co-catalyst would be highly desirable.

Many factors affect the operability of gas phase fluidized bed reactors. Preferably the catalyst is inactive at very high temperatures (i.e., close to the melting point of the polymer). Catalyst deactivation is also a consideration in reactor locations with excessive heat, e.g. those portions of the reactor in which resin may accumulate, leading to sheeting or chunk formation.

Therefore, it would be advantageous to have a catalyst system for which the molecular weight distribution of the produced resin could be changed without the need to change the formulation of the catalyst.

SUMMARY OF THE INVENTION

The instant invention is a process to produce polyolefin polymers and polymers produced from such process.

In one embodiment, the instant invention provides a polymerization process to produce a polyolefin polymer comprising: contacting in a polymerization reactor one or more olefins, a first Ziegler-Natta type procatalyst, a second Ziegler-Natta type procatalyst, and at least one cocatalyst; wherein the first Ziegler-Natta type procatalyst is free of any electron donor component and the second Ziegler-Natta type procatalyst comprises at least one electron donor component.

In an alternative embodiment, the invention provides a polyolefin polymer produced by the inventive process.

In an alternative embodiment, the instant invention provides a process and polymer, in accordance with any of the preceding embodiments, except that the first Ziegler-Natta type procatalyst comprises the spray dried reaction product of contacting a Group 4 metal compound with one or more Titanium compounds selected from the group TiCl3 (Al-activated or hydrogen-reduced), and Ti(OR)4 where R is ethyl, isopropyl or n-butyl in the presence of an alcohol solution comprising at least one C2-C4 alcohol and at least one of MgCl2 and magnesium compounds which form MgCl2 in the presence of the alcohol solution; and wherein the second Ziegler-Natta type procatalyst corresponds to the formula $[Mg]_d Ti(ORe)eXf[ED]q$, wherein; Re is an aliphatic or aromatic hydrocarbon radical having from 1 to 14 carbon atoms or COR' wherein R' is an aliphatic or aromatic hydrocarbon radical having from 1 to 14 carbon atoms; each ORe group is the same or different; X is independently R', chlorine, bromine or iodine; d is 0.5 to 5; e is 0-12; and f is 1-10; ED is an electron donor; q is from 0 to 50; and r is 0, 1, or 2.

In an alternative embodiment, the instant invention provides a process and polymer, in accordance with any of the preceding embodiments, except that the first and second Ziegler-Natta type procatalysts are mixed prior to being fed into the reactor to form a mixed procatalyst feed.

In an alternative embodiment, the instant invention provides a process and polymer, in accordance with any of the preceding embodiments, except that the first and second Ziegler-Natta type procatalysts are separately fed into the reactor.

In an alternative embodiment, the instant invention provides a process and polymer, in accordance with any of the preceding embodiments, except that a feed of the first Ziegler-Natta type procatalyst is decreased as a feed of the second Ziegler-Natta type procatalyst is increased.

In an alternative embodiment, the instant invention provides a process and polymer, in accordance with any of the preceding embodiments, except that the mixed procatalyst feed comprises from 0.8 to 2.1 wt % of the second Ziegler-Natta type procatalyst and from 99.2 to 97.9 wt % of the first Ziegler-Natta type procatalyst based on the total weight of the first and second Zielger-Natta procatalysts.

In an alternative embodiment, the instant invention provides a process and polymer, in accordance with any of the preceding embodiments, except that no electron donor is added to the reactor.

In an alternative embodiment, the instant invention provides a process and polymer, in accordance with any of the preceding embodiments, except that the process further comprises adding a continuity additive to the reactor.

In an alternative embodiment, the instant invention provides a process and polymer, in accordance with any of the preceding embodiments, except that the relative weight percentages of the first and second Ziegler-Natta type procatalysts produce a variation in the molecular weight of the polyolefin polymer.

In an alternative embodiment, the instant invention provides a process and polymer, in accordance with any of the preceding embodiments, except that the relative weight percentages of the first and second Ziegler-Natta type procatalysts produce a variation in the molecular weight distribution of the polyolefin polymer.

In an alternative embodiment, the instant invention provides a process and polymer, in accordance with any of the preceding embodiments, except that the one or more olefins comprises ethylene and further wherein a partial pressure of the ethylene is varied to maintain a constant rate of production of polyolefin.

In an alternative embodiment, the instant invention provides a process and polymer, in accordance with any of the preceding embodiments, except that the second Ziegler-Natta type procatalyst has a second order productivity response to ethylene concentration.

In an alternative embodiment, the instant invention provides a process and polymer, in accordance with any of the preceding embodiments, except that the polymerization is a slurry reactor or a fluidized bed reactor.

In one embodiment, the instant invention provides a polymerization process to produce a polyolefin polymer consisting essentially of: contacting in a polymerization reactor one or more olefins, a first Ziegler-Natta type procatalyst, a second Ziegler-Natta type procatalyst, and at least one cocatalyst; wherein the first Ziegler-Natta type procatalyst is free of any electron donor component and the second Ziegler-Natta type procatalyst comprises at least one electron donor component.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
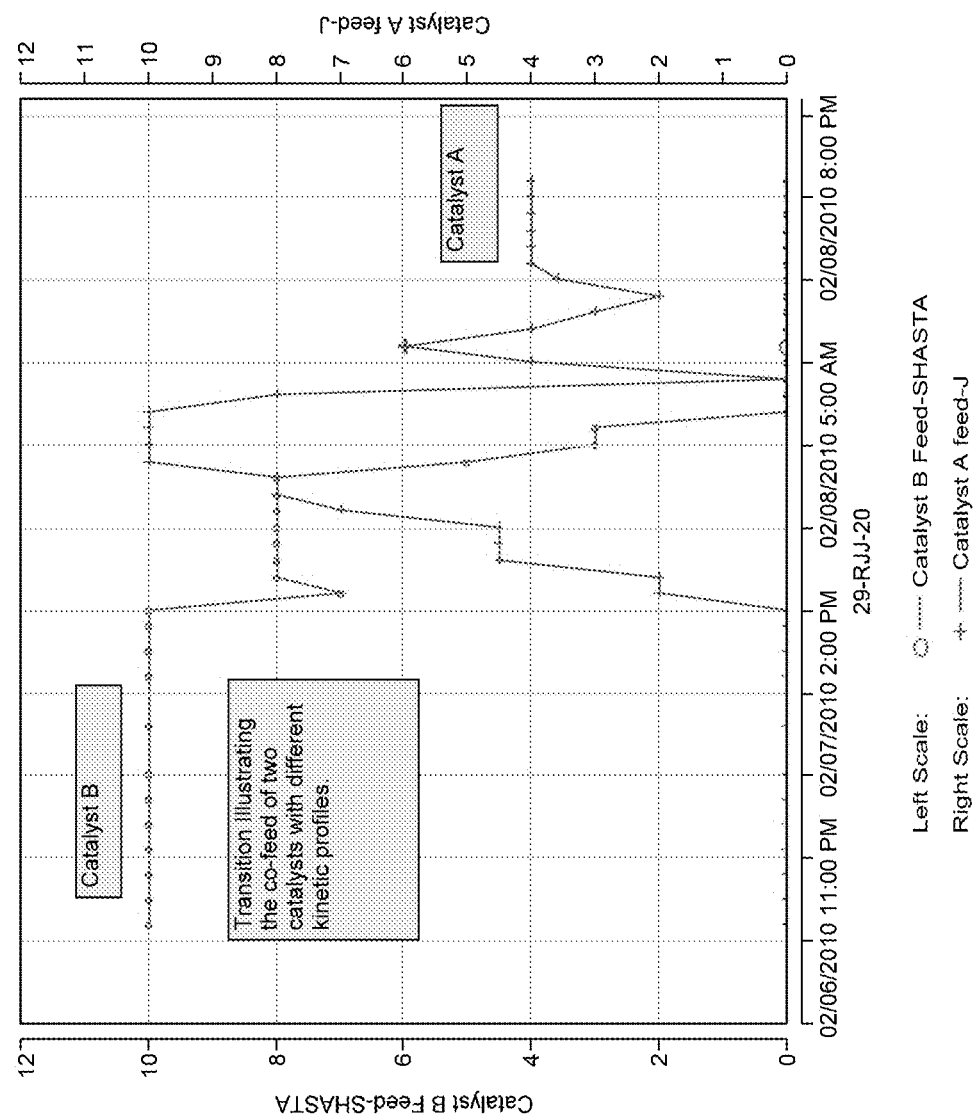
FIG. 1 is a graph illustrating the rate of transition from Procatalyst B to Procatalyst A in Inventive Example 2.

The term "catalyst" or "catalyst composition," as used herein, refers to transition metal compounds, or mixtures thereof, that are useful in catalyzing the polymerization of addition polymerizable monomers. Preferred catalysts are mixtures or complexes of non-metallocene transition metal compounds and magnesium compounds, such as magnesium chloride compounds, alternatively referred to as Ziegler Natta catalysts or Ziegler Natta type catalysts.

The term "procatalyst" as used herein means a catalyst composition ready to be injected or fed into a polymerization reactor and that is activated to an active polymerization catalyst within the polymerization reactor by an additional component, a cocatalyst, such as an aluminum alkyl cocatalyst.

The terms "precursor" and "catalyst precursor" as used herein mean a portion of the catalyst composition containing the transition metals that is subjected to an additional reaction step to convert it into a procatalyst.

The term "polymer" is used herein to indicate, for example, a homopolymer, a copolymer, or a terpolymer. The term "polymer" as used herein also includes interpolymers, such as those made by the copolymerization of ethylene with $C_3$-$C_{10}$ α-olefins or polypropylene with $C_4$-$C_{10}$ α-olefins.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application.

The invention provides a polymerization process to produce a polyolefin polymer comprising contacting in a fluidized bed polymerization reactor or a slurry polymerization reactor one or more olefins, a first Ziegler-Natta type procatalyst, a second Ziegler-Natta type procatalyst, and at least one cocatalyst, wherein the first Ziegler-Natta type procatalyst is free of any electron donor component and the second Ziegler-Natta type procatalyst comprises at least one electron donor component.

The first Ziegler-Natta type procatalyst may comprise the spray dried reaction product of contacting a Group 4 metal compound with one or more Titanium compounds selected from the group $TiCl_3$ (Al-activated or hydrogen-reduced), and $Ti(OR)_4$ where R is ethyl, isopropyl or n-butyl in the presence of an alcohol solution comprising at least one $C_2$-$C_4$ alcohol and at least one of $MgCl_2$ and magnesium compounds which form $MgCl_2$ in the presence of the alcohol solution. Alternatively, the first Ziegler-Natta type procatalyst may be one or more of any of the procatalysts disclosed in the inventive and comparative examples of copending application U.S. Ser. No. 12/759,515 filed on Apr. 13, 2010.

The second Ziegler-Natta type procatalyst may comprise a compound having the formula $Mg_m TiX_p(OR)_r[ED]_q$, wherein: m is 1 to 56, preferably 1.5 to 10; p is 5 to 115, preferably 6 to 13; q is 2 to 85, preferably 3 to 12; r is between 0 and 4; R is an aliphatic or aromatic hydrocarbon radical having from 1 to 14 carbon atoms or COR' wherein R' is an aliphatic or aromatic hydrocarbon radical having from 1 to 14 carbon atoms; each $OR^e$ group is the same or different; X is independently chlorine, bromine or iodine; ED is an electron donor compound chosen from alkyl esters of aliphatic and aromatic carboxylic acids, aliphatic ethers, cycloaliphatic ethers and aliphatic ketones. Particularly useful are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbon atoms, preferably from 4 to 5 carbon atoms; cycloaliphatic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred electron donor is tetrahydrofuran.

The second Ziegler-Natta procatalyst component may then be isolated as a solid by means such as spray drying or impregnation into inert solids supports. Spray drying is especially preferred.

The contacting step of the inventive process may occur in any appropriate polymerization reactor. In preferred embodiments, the inventive process is conducted in the reactor configurations disclosed in WO2008US87581 and WO2008US87378, the disclosures of which are incorporated herein by reference. Such reactors include multiple reactors in series.

The first and second Ziegler-Natta type procatalysts may be mixed prior to being fed into the reactor to form a mixed procatalyst feed. The mixed procatalyst feed comprises between 0.5 and 20 wt % of the second Ziegler-Natta type procatalyst and between 99.5 and 80 wt % of the first Ziegler-Natta type procatalyst based on the total weight of the first and second Zielger-Natta procatalysts. All individual values greater than or equal to 0.5 wt % and equal to or less than 10 wt % of the first Ziegler-Natta type procatalyst are included herein and disclosed herein; for example, the first Ziegler-Natta type procatalyst could have an upper limit of 2.1 wt %, 1.9 wt %, 1.6 wt % or 1.3 wt % and a lower limit of 0.8 wt %, 0.9 wt %, 1.1 wt % or 1.2 wt %. Likewise all individual values greater than or equal to 97.9 wt % and equal to or less than 99.2 wt % of the second Ziegler-Natta type procatalyst are included herein and disclosed herein; for example, the second Ziegler-Natta type procatalyst could have an upper limit of 99.2 wt %, 98.9 wt %, 98.5 wt % or 98.0 wt % and a lower limit of 97.9 wt %, 98.0 wt %, 98.3 wt % or 98.4 wt %.

Alternatively, the first and second Ziegler-Natta type procatalysts may be separately fed into the reactor. Alternatively, the first Ziegler-Natta type procatalyst may be first fed into a polymerization reactor, with the feed amount of the first Ziegler-Natta type procatalyst subsequently decreased. Alternatively, the polymerization process may be begun with no feed of the second Ziegler-Natta type procatalyst, with the amount of the second Ziegler-Natta type procatalyst subsequently increased.

Alternatively, the amounts and rates of feed of the first and second Ziegler-Natta type procatalysts may be tailored to produce a variation in the molecular weight and/or molecular weight distribution of the polyolefin polymer produced by the inventive process.

The contacting step of the inventive process may be conducted in the absence of any electron donor added into the polymerization reactor other than the electron donor that is a component of the second Ziegler-Natta type procatalyst.

The contacting step may be conducted in the presence of a continuity additive which improves the operability of the polymerization reactor. Such continuity additives are disclosed in WO2009088701, the disclosure of which is incorporated herein by reference.

The inventive process may be used to produce a polyolefin polymer. In certain embodiments, the polyolefin polymer is polyethylene. In other embodiments, the polyolefin polymer may be a copolymer, most preferably including ethylene units and units of a C3-C6 olefin. The polyolefin polymers produced by some embodiments of the inventive process may have an $I_{21}$ that is between 7% and 12%, alternatively between 8% and 11%, alternatively between 9% and 10%, greater than that of polyolefin polymers produced solely in the presence of the first Ziegler-Natta type procatalyst. The polyolefin polymers produced by some embodiments of the inventive process may have an $I_{21}/I_2$ that is between 10% and 16%, alternatively between 11% and 15%, alternatively between 12% and 14%, less than that of polyolefin polymers produced solely in the presence of the first Ziegler-Natta type procatalyst.

The partial pressure of the one or more olefins maintained in the polymerization reactor may be varied in some embodiments of the invention in order to maintain a constant desired rate of production of polyolefin.

Gas phase fluidized bed reactors useful in the invention are described in WO2008US87581 and WO2008US87378, the disclosures of which are incorporated herein by reference. The reactors may be utilized either in single reactor mode or in linked reactor mode, depending on the final product properties desired in the polymer.

Slurry reactor systems useful in the invention are described in EP1773892, the disclosure of which may be incorporated herein by reference. The reactors may be utilized either in single reactor mode or in linked reactor mode, depending on the final product properties desired in the polymer.

EXAMPLES

The Inventive Examples illustrate some of the particular embodiments of the invention, but the following should not be construed to mean the invention is limited to such particular embodiments.

Procatalysts Preparation

Procatalyst A was prepared following the examples of U.S. Pat. No. 6,187,866, except as expressly described. The entire disclosure of U.S. Pat. No. 6,187,866 is incorporated herein by reference. A feedstock primarily containing anhydrous tetrahydrofuran (THF), which has been dried to less than about 50 ppm water, was heated to approximately 50° C. Granular magnesium metal (100 to about 4000 micron in particle size) was then added to the THF followed by addition of titanium tetrachloride. The mixture was then heated to approximately 70° C. Without being bound by any particular theory, it is currently believed that the Mg metal chemically reduces the titanium tetrachloride to lower valence states, primarily to the +3 valence state. A Mg/Ti molar ratio of slightly higher than 0.5 was used to assure essentially complete reduction of the $Ti^{+4}$ to lower valence states. Magnesium dichloride was then added to bring the total molar ratio of magnesium to titanium in the mixture to between 5.5:1 to 6:1. This mixture was then heated and mixed further for approximately 4 to 6 hours followed by filtration to remove any unreacted magnesium metal and impurities present in the magnesium dichloride that were insoluble in the THF. Finally, fumed silica, Cab-O-Sil TS-610, available from the Cabot Corporation, was added and mixing was continued until the fumed silica was dispersed, producing a spray drying feedstock. Per 100 liters of THF, 4.8 to 5 moles of magnesium metal, 9.7 to 10.1 moles of titanium tetrachloride and 49 to 55 moles of magnesium dichloride were used to make the solution.

Approximately 6.2 to 7 kilograms of the fumed silica were added to produce the spray drying feedstock. The spray drying feedstock was spray dried using an 8-foot diameter closed cycle spray dryer equipped with a rotary atomizer using nitrogen as the drying gas. The rotary atomizer was adjusted to give catalyst particles with a D50 of 25 microns. The spray dried catalyst precursor contained approximately 2.5 weight percent Ti, 6.3 weight percent Mg, and 25 to 29 weight percent THF. The spray dried catalyst precursor particles had a D50 of 25 microns and a span [(D90−D10)/D50] of less than 2 as determined by means of a Leeds and Northrup Microtrac® particle size analyzer using a dodecane solvent. The discrete catalyst precursor particles were mixed with mineral oil under a nitrogen atmosphere to form a slurry containing approximately 28 weight percent of the solid catalyst precursor. The catalyst precursor slurry was then fed to the polymerization reactor. Triethyaluminum was used as cocatalyst.

Procatalyst B was prepared according to the following method:

Catalyst precursor solution was prepared as follows:

Under inert reaction conditions, the components shown in Table 1 were charged to a solution preparation vessel.

TABLE 1

| Feedstock Charge | |
|---|---|
| Ethanol, kg | 1000 |
| MgCl$_2$, kg | 50.34 |
| TiCl$_3$ AA, kg | 20.34 |
| HfCl$_4$, kg | 33.64 |
| CAB-O-SIL ™ TS-610, kg | 70.00 |

Ethanol was charged first followed by MgCl$_2$, HfCl$_4$ and TiCl$_3$ (AA). Amounts listed were aim values, some slight losses occurred although the amounts are all within 5% by weight of the amount given. The ethanol used was specially denatured ethanol from BrüggemannChemical U.S., Inc. (Newtown Square, Pa.) containing about 0.5% by weight of toluene and <100 ppm water. Magnesium chloride was obtained from SRC, Inc. (Cleveland, Ohio), Hafnium Tetrachloride (containing up to 1 wt % Zirconium) from ATI Wah-Chang (Albany, Oreg.) and aluminum activated titanium trichloride from W.R. Grace & Co. CAB-O-SIL™ TS-610 (which is a filler) was obtained from the Cabot Corporation.

The mixture was stirred at 35 to 50° C. under a nitrogen blanket for about 8 hours prior to the start of spray drying. A 2.5 meter Niro Atomizer spray dryer with the FS-15 atomizer was used. Atomizer speed was adjusted to obtain an average particle size of the catalyst precursor of about 30 microns. Inlet temperature was adjusted to achieve an outlet temperature between 105 and 110° C. and the feedstock was spray dried at a rate of 100 to 150 kg/hr.

Particle size data was determined using a Malvern Mastersizer 2000 particle size analyzer and is given in the Table 2. Heptane was used as dispersant and the General Purpose (Spherical) particle model was used to calculate particle size. Sonication was utilized (50% power, 30 to 60 seconds) to break up any agglomerates that might have formed in the sampling process.

TABLE 2

| Particle Size, (Microns) | Volume (%) |
|---|---|
| 0.55 | 0.07 |
| 0.63 | 0.1 |
| 0.724 | 0.12 |
| 0.832 | 0.15 |
| 0.955 | 0.18 |
| 1.096 | 0.21 |
| 1.259 | 0.23 |
| 1.445 | 0.24 |
| 1.66 | 0.22 |
| 1.905 | 0.21 |
| 2.188 | 0.23 |
| 2.512 | 0.3 |
| 2.884 | 0.45 |
| 3.311 | 0.7 |
| 3.802 | 1.05 |
| 4.365 | 1.49 |
| 5.012 | 1.95 |
| 5.754 | 2.4 |
| 6.607 | 2.76 |
| 7.586 | 2.99 |
| 8.71 | 3.07 |
| 10 | 3.02 |
| 11.482 | 2.91 |

TABLE 2-continued

| Particle Size, (Microns) | Volume (%) |
|---|---|
| 22.909 | 4.63 |
| 26.203 | 5.58 |
| 30.2 | 6.52 |
| 34.674 | 7.26 |
| 39.811 | 7.64 |
| 45.709 | 7.52 |
| 52.481 | 6.88 |
| 60.256 | 5.8 |
| 69.183 | 4.45 |
| 79.433 | 3.03 |
| 91.201 | 1.75 |
| 104.713 | 0.73 |
| 120.226 | 0.11 |

The precursor powder was first dispersed in isopentane, then the halogenation agent, ethylaluminum sesquichloride (EASC), was added at a 2.0 "Cl to ethoxide" molar ratio. Ethoxide as described here is either free ethanol remaining in the spray dried catalyst precursor or ethoxide ligands present, for example, on the Hf, Ti and/or Zr components. Ethoxide content is measured as ethanol after the catalyst precursor is contacted with acidified (HCl) water. A sample of the liquid phase is then injected into a gas chromatograph and ethanol content determined. The slurry was mixed at 50° C. for one hour, and then the solids allowed to settle. The supernatant liquid was decanted, an additional volume of heptane was added, and this step repeated two additional times. Hydrobrite 380 mineral oil, available from Sonneborn, Inc. (Mahwah, N.J.), was then added to produce a slurry of halogenated catalyst precursor. Vacuum was drawn on the slurry for to evaporate additional heptane prior to use. Final heptane content in the precursor slurry was approximately 5 w %. The precursor had an ethoxide content of approximately 25% (ranging from 24 to 27%). The final procatalyst slurry was between 19.5 and 20% by weight solids.

Procatalyst C was prepared according to the following method:

1.5% by weight of Procatalyst A (as solids) was added to the slurry of Procatalyst B to form a Procatalyst C slurry containing a solids composition of 98.5 wt % Procatalyst B and 1.5 wt % Procatalyst A.

Comparative Example 1 and Inventive Example 1

Comparative Example 1 is a polymerization reaction conducted using Procatalyst B. Inventive Ex. 1 is a polymerization reaction conducted using Procatalyst C which is a combined Procatalyst A and Procatalyst B slurry as described above.

The polymerization reactions were effected in a dual reactor system as described in PCT Publication Nos. WO2009088701 and WO2009085922. A Continuity Additive, a 1:1 mixture by weight of aluminum distearate and diethyoxylated stearyl amine, was used in each polymerization reaction at a level of approximately 10 ppmw/gram resin in the fluidized bed in the first reactor. Procatalyst was fed as a mineral oil slurry and carried into the reactor with an isopentane carrier.

Procatalyst B and the mixed procatalyst, Procatalyst C, were used in a dual reactor system to produce the first portion of a product which will be used for small part blow molding. The effluent product from the first reactor was then passed into a second reactor where additional polymer is produced.

Reaction conditions for each of the first and second reactors are given in Table 3. Production rate was maintained essentially constant in both reactors. The cocatalyst used was 1 wt % triethylaluminum in isopentane. The feed rate of the cocatalyst was adjusted to maintain approximately 14 Al:Ti ratio in the first reactor and approximately 20 Al:Ti ratio in the second reactor. All other reactor conditions were maintained effectively constant. Residence time in each of the two reactors was approximately 3 hours for each of the Comparative and Inventive Examples. Final titanium concentration in the polymer from the second reactor was approximately 1.5 ppm.

TABLE 3

|  | Comparative Ex. 1 | Inventive Ex. 1 |
|---|---|---|
| First Reactor Conditions |  |  |
| Hydrogen/Ethylene ("$H_2/C_2$") Molar Ratio | 0.134 | 0.134 |
| Hexene/Ethylene ("C6/C2") Molar Ratio | 0.0096 | 0.0095 |
| $C_2$ partial pressure (psi) | 59.0 | 58.6 |
| Temperature (° C.) | 82 | 82 |
| Second Reactor Conditions |  |  |
| $H_2/C_2$ Molar Ratio | 1.30033 | 1.30270 |
| $C_2$ partial pressure (psi) | 119.170 | 116.587 |
| Temperature (° C.) | 110 | 110 |

TABLE 4

| First Reactor Resin Properties | | |
|---|---|---|
|  | Comparative Ex. 1 | Inventive Ex. 1 |
| $I_{21}$, dg/min | 0.625 | 0.787 |
| Density, g/cm$^3$ | 0.9382 | 0.9393 |

TABLE 5

| Final Resin Properties | | |
|---|---|---|
|  | Comparative Ex. 1 | Inventive Ex. 1 |
| $I_{21}$, dg/min | 24.73 | 27.13 |
| $I_{21}/I_2$ | 132.9 | 115.0 |
| Density, g/cm$^3$ | 0.9574 | 0.9581 |

Table 4 provides the resin properties of the resin produced in the first reactor. Table 5 provides the final resin properties; that is, Table 5 provides the properties of the resin exiting the second reactor. Each of the resin properties given in Tables 4 and 5 are average values obtained from between 9 and 25 separate sample measurements.

Inventive Example 2

Inventive Example 2 was a polymerization reaction conducted with a co-feed of Procatalyst A and Procatalyst B. The polymerization reaction was effected in a the first reactor of the dual reactor system as described in WO2008US87581 and WO2008US87378. That is, the product of the first reactor was not further subjected to polymerization in a second reactor.

Figure 2:
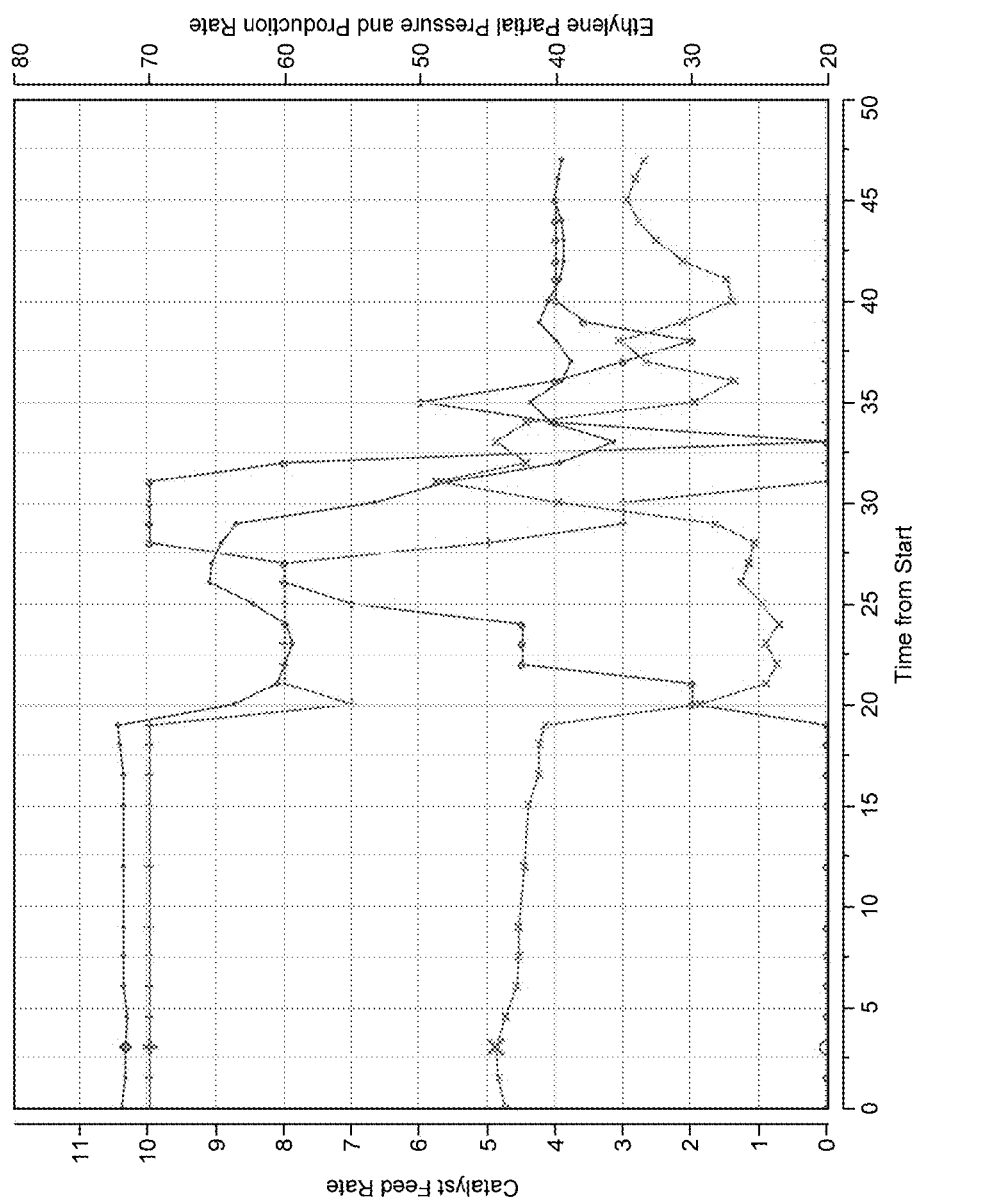
FIG. 2 is a graph illustrating the on production rate of the procatalyst transition shown in FIG. 1.
Figure 3:
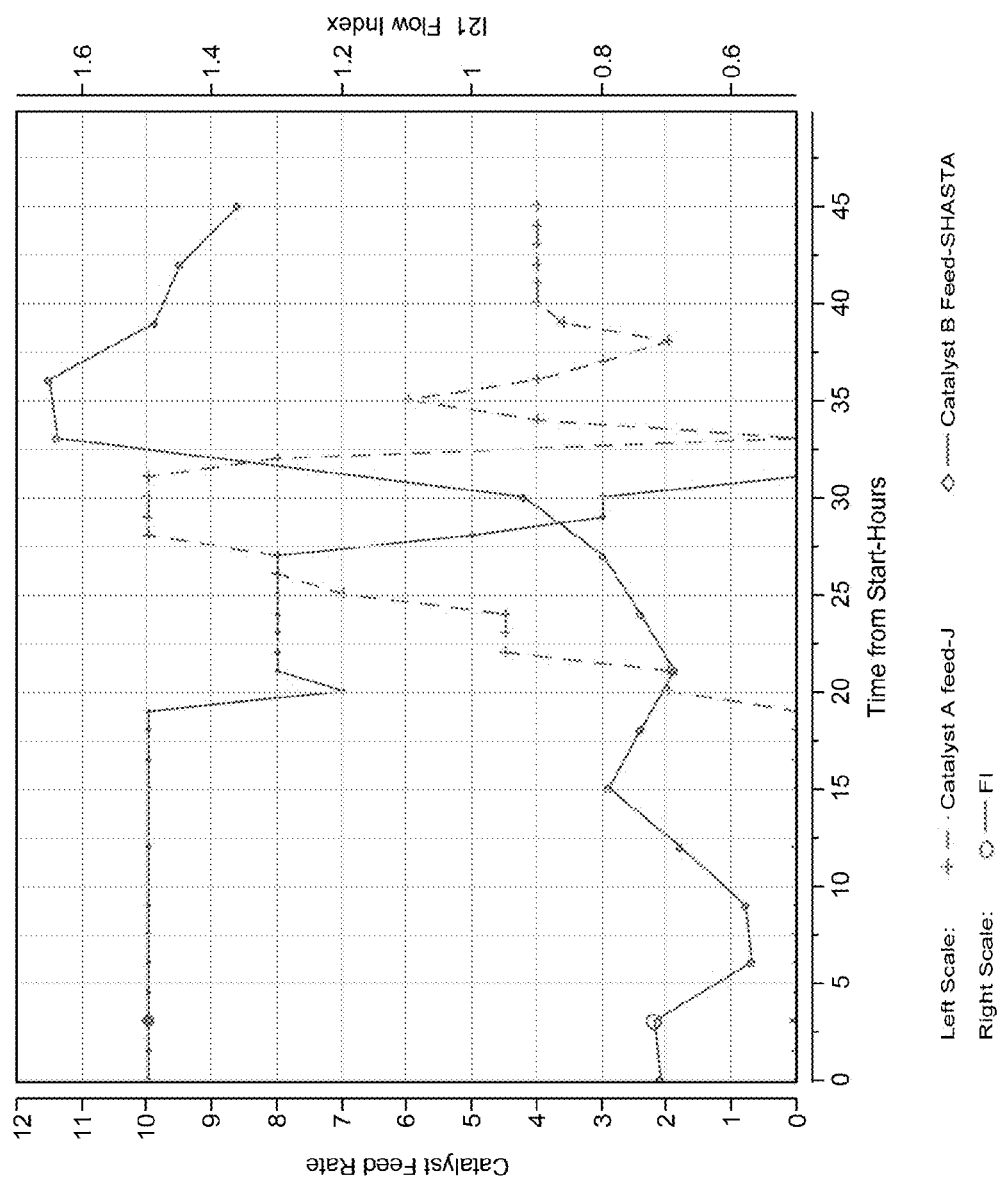
FIG. 3 is a graph illustrating the effect on the polymer flow index, $I_{21}$, of the transition of procatalyst feed illustrated in FIG. 1.

Inventive Example 2 polymerization reaction was begun with Procatalyst B feed and was subsequently transitioned to a Procatalyst A feed. Polymerization was maintained during the transition. Procatalyst B feed was decreased and Procatalyst A feed increased until 100% of the procatalyst feed was Procatalyst A. Production rate was manipulated through the transition by adjusting ethylene partial pressure and adjusting feed rate of Procatalyst A. The transition from Procatalyst B to Procatalyst A is depicted in FIG. 1. FIGS. 2 and 3 illustrate the effect of the procatalyst transition on the rate of polymer production and the polymer flow index, $I_{21}$, respectively.

Ethylene ("C2") partial pressure was varied to maintain production rate constant. However, there is a differences in kinetics between the polymerization reaction with Procatalyst A and that with Procatalyst B. Specifically, Catalyst Productivity=K (C2 partial pressure)$^x$, where K is also a function of reaction conditions, x=1 for Procatalyst B and x≈2 for Procatalyst A. Therefore, it was difficult to both change catalyst feed rates and adjust ethylene partial pressure to maintain a transition at constant production rates. In addition, there are differences in the decay rate of the two catalyst systems once activated in the reactor by the presence of the cocatalyst. Specifically:

Catalyst System A→Deactivation Rate is ~0.25 to 0.4 Hr$^{-1}$; and

Catalyst System B→Deactivation Rate is ~0.05 to 0.15 Hr$^{-1}$.

Catalyst System A is Procatalyst A plus the cocatalyst and Catalyst System B is Procatalyst B plus the cocatalyst.

Catalyst System A produces a very narrow molecular weight distribution in comparison to Catalyst B and, at constant reaction conditions (H2/C2 and C6/C2 molar ratios), produces resin of lower average molecular weight. $I_{21}$ can be related to the number average molecular weight of the polymer. Higher values of $I_{21}$ denote lower values of number average molecular weight. Similarly, $I_2$ is related to the weight average molecular weight.

Tables 6 and 7 provide the hourly average values for various process parameters for the polymerization reaction of Inventive Example 3. Procatalysts A and B were fed as slurries in mineral oil and their feed rates are reported in cc/hr in Tables 6 and 7. EB Rate in Table 7 is an energy balance calculated production rate given in pounds of polymer per hour, calibrated against an actual mass production rate.

TABLE 6

| Time from Start | $I_{21}$, dg per min | Density, g/cm$^3$ | Procatalyst A feed | Procatalyst B feed | Reactor Temperature (° C.) | C2 partial pressure, Psi | C6/C2 Molar ratio | H2/C2 Molar Ratio |
|---|---|---|---|---|---|---|---|---|
| 0.00 | 0.710 | 0.9360 | 0.0 | 10.0 | 82.00 | 72.2 | 0.015 | 0.105 |
| 1.50 | N/A | N/A | 0.0 | 10.0 | 82.00 | 71.9 | 0.015 | 0.105 |
| 3.00 | 0.720 | 0.9362 | 0.0 | 10.0 | 82.00 | 71.9 | 0.015 | 0.105 |
| 4.50 | N/A | N/A | 0.0 | 10.0 | 81.99 | 71.8 | 0.015 | 0.105 |
| 6.00 | 0.570 | 0.9361 | 0.0 | 10.0 | 82.00 | 72.0 | 0.015 | 0.105 |
| 7.50 | N/A | N/A | 0.0 | 10.0 | 82.00 | 72.0 | 0.015 | 0.105 |
| 9.00 | 0.580 | 0.9363 | 0.0 | 10.0 | 82.00 | 72.0 | 0.015 | 0.105 |
| 12.00 | 0.680 | 0.9362 | 0.0 | 10.0 | 82.00 | 72.0 | 0.014 | 0.105 |
| 15.00 | 0.790 | 0.9365 | 0.0 | 10.0 | 82.00 | 72.1 | 0.014 | 0.105 |
| 16.50 | N/A | N/A | 0.0 | 10.0 | 82.00 | 71.9 | 0.014 | 0.105 |

TABLE 6-continued

| Time from Start | I₂₁, dg per min | Density, g/cm³ | Pro-catalyst A feed | Pro-catalyst B feed | Reactor Temperature (° C.) | C2 partial pressure, Psi | C6/C2 Molar ratio | H2/C2 Molar Ratio |
|---|---|---|---|---|---|---|---|---|
| 18.00 | 0.740 | N/A | 0.0 | 10.0 | 82.00 | 72.2 | 0.014 | 0.105 |
| 19.00 | N/A | N/A | 0.0 | 10.0 | 82.00 | 72.4 | 0.014 | 0.105 |
| 20.00 | N/A | N/A | 2.0 | 7.0 | 81.93 | 63.9 | 0.014 | 0.105 |
| 21.00 | 0.690 | 0.9366 | 2.0 | 8.0 | 81.98 | 60.7 | 0.015 | 0.104 |
| 22.00 | N/A | N/A | 4.5 | 8.0 | 82.00 | 60.1 | 0.014 | 0.106 |
| 23.00 | N/A | N/A | 4.5 | 8.0 | 82.00 | 59.7 | 0.014 | 0.107 |
| 24.00 | 0.740 | 0.9367 | 4.5 | 8.0 | 82.00 | 60.0 | 0.014 | 0.106 |
| 25.00 | N/A | N/A | 7.0 | 8.0 | 82.02 | 62.5 | 0.014 | 0.105 |
| 26.00 | N/A | N/A | 8.0 | 8.0 | 82.00 | 65.7 | 0.014 | 0.102 |
| 27.00 | 0.800 | 0.9370 | 8.0 | 8.0 | 81.99 | 65.5 | 0.014 | 0.103 |
| 28.00 | N/A | N/A | 10.0 | 5.0 | 82.00 | 64.9 | 0.014 | 0.104 |
| 29.00 | N/A | N/A | 10.0 | 3.0 | 82.03 | 63.7 | 0.014 | 0.107 |
| 30.00 | 0.920 | 0.9373 | 10.0 | 3.0 | 82.07 | 53.6 | 0.015 | 0.122 |
| 31.00 | N/A | N/A | 10.0 | 0.0 | 81.96 | 48.0 | 0.015 | 0.119 |
| 32.00 | N/A | N/A | 8.0 | 0.0 | 82.03 | 39.8 | 0.014 | 0.113 |
| 33.00 | 1.640 | 0.9388 | 0.0 | 0.0 | 82.01 | 35.9 | 0.019 | 0.107 |
| 34.00 | N/A | N/A | 4.0 | 0.0 | 81.95 | 40.6 | 0.017 | 0.109 |
| 35.00 | N/A | N/A | 6.0 | 0.0 | 81.95 | 42.1 | 0.015 | 0.100 |
| 36.00 | 1.650 | 0.9390 | 4.0 | 0.0 | 82.02 | 39.7 | 0.013 | 0.110 |
| 37.00 | N/A | N/A | 3.0 | 0.0 | 82.04 | 39.0 | 0.014 | 0.113 |
| 38.00 | N/A | N/A | 2.0 | 0.0 | 82.00 | 40.2 | 0.015 | 0.107 |
| 39.00 | 1.490 | 0.9368 | 3.6 | 0.0 | 81.96 | 41.4 | 0.014 | 0.102 |
| 40.00 | N/A | N/A | 4.0 | 0.0 | 82.00 | 40.7 | 0.014 | 0.104 |
| 41.00 | N/A | N/A | 4.0 | 0.0 | 82.02 | 39.9 | 0.015 | 0.108 |
| 42.00 | 1.450 | 0.9369 | 4.0 | 0.0 | 82.02 | 39.6 | 0.015 | 0.107 |
| 43.00 | N/A | N/A | 4.0 | 0.0 | 82.02 | 39.6 | 0.014 | 0.107 |
| 44.00 | N/A | N/A | 4.0 | 0.0 | 82.01 | 39.8 | 0.015 | 0.106 |
| 45.00 | 1.36 | 0.9392 | 4.0 | 0.0 | 82.00 | 40.3 | 0.014 | 0.105 |
| 46.00 | N/A | N/A | N/A | N/A | 82.01 | 40.0 | 0.014 | 0.105 |
| 47.00 | N/A | N/A | N/A | N/A | 82.00 | 39.7 | 0.014 | 0.107 |

TABLE 7

| Time from Start | EB Rate | Co-catalyst Feed (cc/hr) | iC5%* | Ti, ppm | Al, Ppm | Al/Ti | Bulk Density, g/cm³ | APS** Inch | <70 micron wt % |
|---|---|---|---|---|---|---|---|---|---|
| 0.00 | 43.91 | 186 | 17.18 | 3.37 | 21.0 | 11.23 | 24.40 | 0.038 | 0.510 |
| 1.50 | 44.36 | 184 | 17.35 | N/A | N/A | N/A | N/A | N/A | N/A |
| 3.00 | 44.50 | 184 | 17.35 | 3.14 | 19.4 | 10.99 | 24.80 | 0.039 | 0.501 |
| 4.50 | 43.80 | 186 | 17.16 | N/A | N/A | N/A | N/A | N/A | N/A |
| 6.00 | 43.10 | 187 | 17.08 | 3.21 | 27.5 | 15.25 | 25.10 | 0.040 | N/A |
| 7.50 | 42.83 | 187 | 17.04 | N/A | N/A | N/A | N/A | N/A | N/A |
| 9.00 | 42.92 | 188 | 17.13 | 2.83 | 23.5 | 14.79 | 24.70 | N/A | 0.490 |
| 12.00 | 42.53 | 190 | 16.92 | 3.04 | 22.3 | 13.09 | 25.60 | 0.039 | 0.490 |
| 15.00 | 42.17 | 187 | 16.93 | 3.09 | 23.4 | 13.53 | 25.00 | N/A | 0.490 |
| 16.50 | 41.35 | 191 | 16.94 | N/A | N/A | N/A | N/A | N/A | N/A |
| 18.00 | 41.43 | 184 | 17.02 | 2.83 | 21.7 | 13.61 | N/A | N/A | N/A |
| 19.00 | 40.94 | 188 | 17.33 | N/A | N/A | N/A | N/A | N/A | N/A |
| 20.00 | 29.45 | 242 | 17.62 | N/A | N/A | N/A | N/A | N/A | N/A |
| 21.00 | 24.73 | 242 | 17.24 | 2.99 | 24.4 | 14.49 | N/A | N/A | N/A |
| 22.00 | 23.84 | 243 | 16.92 | N/A | N/A | N/A | N/A | N/A | N/A |
| 23.00 | 24.64 | 310 | 16.90 | N/A | N/A | N/A | N/A | N/A | N/A |
| 24.00 | 23.77 | 311 | 17.26 | 3.3 | 36.4 | 19.58 | 25.60 | 0.037 | 0.699 |
| 25.00 | 24.93 | 313 | 17.50 | N/A | N/A | N/A | N/A | N/A | N/A |
| 26.00 | 26.52 | 314 | 17.31 | N/A | N/A | N/A | N/A | N/A | N/A |
| 27.00 | 25.90 | 312 | 17.28 | 3.34 | 40.6 | 21.58 | 25.30 | N/A | N/A |
| 28.00 | 25.51 | 318 | 17.15 | N/A | N/A | N/A | N/A | N/A | N/A |
| 29.00 | 28.38 | 340 | 17.10 | N/A | N/A | N/A | N/A | N/A | N/A |
| 30.00 | 39.96 | 346 | 17.36 | 3.05 | 42.9 | 24.97 | 24.30 | 0.036 | 1.020 |
| 31.00 | 48.99 | 347 | 17.28 | N/A | N/A | N/A | N/A | N/A | N/A |
| 32.00 | 42.39 | 349 | 16.85 | N/A | N/A | N/A | N/A | N/A | N/A |
| 33.00 | 44.52 | 326 | 13.77 | 2.22 | 46.3 | 37.03 | 23.30 | N/A | N/A |
| 34.00 | 42.28 | 300 | 15.65 | N/A | N/A | N/A | N/A | N/A | N/A |
| 35.00 | 29.95 | 264 | 16.83 | N/A | N/A | N/A | N/A | N/A | N/A |
| 36.00 | 27.06 | 257 | 16.35 | 1.97 | 38.5 | 34.70 | 23.50 | 0.036 | 1.020 |
| 37.00 | 33.55 | 246 | 15.58 | N/A | N/A | N/A | N/A | N/A | N/A |
| 38.00 | 35.51 | 216 | 15.37 | N/A | N/A | N/A | N/A | N/A | N/A |
| 39.00 | 30.76 | 209 | 14.99 | 1.6 | 35.5 | 39.39 | 23.20 | N/A | N/A |
| 40.00 | 27.24 | 210 | 14.98 | N/A | N/A | N/A | N/A | N/A | N/A |
| 41.00 | 27.64 | 194 | 14.84 | N/A | N/A | N/A | N/A | N/A | N/A |
| 42.00 | 30.78 | 190 | 14.59 | 1.52 | 33.2 | 38.78 | 24.97 | 0.037 | 0.806 |

TABLE 7-continued

| Time from Start | EB Rate | Co-catalyst Feed (cc/hr) | iC5%* | Ti, ppm | Al, Ppm | Al/Ti | Bulk Density, g/cm³ | APS** Inch | <70 micron wt % |
|---|---|---|---|---|---|---|---|---|---|
| 43.00 | 32.83 | 191 | 14.10 | N/A | N/A | N/A | N/A | N/A | N/A |
| 44.00 | 34.11 | 193 | 13.77 | N/A | N/A | N/A | N/A | N/A | N/A |
| 45.00 | 34.96 | 165 | 13.52 | 1.74 | 29.4 | 30.00 | 24.63 | N/A | N/A |
| 46.00 | 34.34 | 167 | 13.60 | N/A | N/A | N/A | N/A | N/A | N/A |
| 47.00 | 33.72 | 168 | 13.92 | N/A | N/A | N/A | N/A | N/A | N/A |

*iC5% is mole percent of isopentane.
**Average Particle Size.

Comparative Example 2

Procatalyst B does not include an internal electron donor. However, the Mg and Ti concentrations of Procatalyst A and Procatalyst B are similar. In fact, Procatalyst A may be produced using the same Ti compound as used to prepare Procatalyst B. Therefore, it may be anticipated that combining the electron donor of Procatalyst A, i.e., tetrahydrofuran, with Procatalyst B would result in the production of polymer with a molecular weight distribution similar to that achieved with Procatalyst A.

Comparative Example 2 was a polymerization reaction effected as with Inventive Example 2 except using Procatalyst B feed. In addition, a 0.5 wt % solution of tetrahydrofuran ("THF") in isopentane was fed directly into the fluidizing bed of the reactor. The THF solution was fed at a molar ratio of 2 to 1 based on the Titanium feed in Procatalyst B. Reactor temperature was increased from 82° C. (as in Inventive Example 2) to 92° C. No positive effect on $I_{21}$, i.e., reduction in molecular weight, was observed. Moreover, catalyst activity declined with THF solution feed, namely, from 2.6 ppm Ti residual before THF solution feed to ~3.1 ppm Ti residual following THF solution feed. Thus, the mere inclusion of an electron donor in reactor feed does not effectuate the change in molecular weight distribution or molecular weight profile of produced polymer which is obtained with the inventive embodiments.

Test Methods

The following test methods were used:
Particle Size Distribution
Polymer particle size distribution was calculated using the data obtained from screen measurement using a standard set of mesh sieves—10/18/35/60/120/200/pan (having mesh opening sizes of 2000/1000/500/250/125/70/0 microns respectively) and calculated using the mass of resin retained on each sieve. Fines are defined as resin particles on the 200 mesh screen and on the pan. The pan fraction actual size is generally assumed to be the average of 70 and zero, i.e. 35 microns.

Density
Resin density is measured by the Archimedes displacement method, ASTM D 792-00, Method B, in isopropanol. Specimens are measured within one hour of molding, after conditioning in the isopropanol bath at 23° C., for 8 minutes, to achieve thermal equilibrium prior to measurement. The specimens are compression molded according to ASTM D-4703-00, Annex A, with a five minutes initial heating period at about 190° C., and a 15° C./min cooling rate per Procedure C. The specimen is cooled to 45° C. in the press, with continued cooling until "cool to the touch."

Melt Index and Melt Flow Rate
Melt flow rate measurements for the ethylene-based polymers are performed according to ASTM D-1238-04, Condition 190° C./2.16 kg, Condition 190° C./5 kg and Condition 190° C./21.6 kg, which are known as $I_2$, $I_5$ and $I_{21}$, respectively. Melt flow rate is inversely proportional to the molecular weight of the polymer. Thus, the higher the molecular weight, the lower the melt flow rate, although the relationship is not linear. Melt Flow Ratio (MFR) is the ratio of $I_{21}$ to $I_2$, unless otherwise specified.

Residual Metals
Titanium, aluminum and hafnium residuals were measured as ppm by wt using X-ray Diffraction techniques with appropriate standards.

Bulk Density
The Bulk Density measurement was a poured bulk density using a standard 500 cc volumetric cylinder.

I claim:

1. A polymerization process to produce a polyolefin polymer comprising:
   contacting in a polymerization reactor one or more olefins, a first Ziegler-Natta type procatalyst, a second Ziegler-Natta type procatalyst, and at least one cocatalyst;
   wherein the first Ziegler-Natta type procatalyst is free of any electron donor component and the second Ziegler-Natta type procatalyst comprises at least one electron donor component; and
   wherein the first Ziegler-Natta type procatalyst comprises a spray dried reaction product of contacting a Group 4 metal compound with one or more titanium compounds selected from the group consisting of $TiCl_3$ (Al-activated or hydrogen-reduced) and $Ti(OR)_4$, where R is ethyl, isopropyl or n-butyl, in the presence of an alcohol solution comprising at least one $C_2$-$C_4$ alcohol and at least one of $MgCl_2$ or magnesium compounds which form $MgCl_2$ in the presence of the alcohol solution; and wherein
   the second Ziegler-Natta type procatalyst corresponds to the formula $[Mg]_d Ti(OR^e)_e X_f [ED]_q$, wherein; $R^e$ is an aliphatic or aromatic hydrocarbon radical having from 1 to 14 carbon atoms or COR' wherein R' is an aliphatic or aromatic hydrocarbon radical having from 1 to 14 carbon atoms; each $OR^e$ group is the same or different; X is independently R', chlorine, bromine or iodine; d is 0.5 to 5; e is 0-12; and f is 1-10; ED is an electron donor; and q is from 0 to 50.

2. The process according to claim 1, wherein the first and second Ziegler-Natta type procatalysts are mixed to form a mixed procatalyst feed prior to being fed into the reactor.

3. The process of claim 2 wherein the mixed procatalyst feed comprises between 0.8 and 2.1 wt % of the second Ziegler-Natta type procatalyst and between 99.2 and 97.9 wt % of the first Ziegler-Natta type procatalyst based on the total weight of the first and second Zielger-Natta procatalysts.

4. The process of claim 3 wherein the relative weight percentages of the first and second Ziegler-Natta type procatalysts produce a variation in the molecular weight of the polyolefin polymer.

5. The process of claim 3 wherein the relative weight percentages of the first and second Ziegler-Natta type procatalysts produce a variation in the molecular weight distribution of the polyolefin polymer.

6. The process according to claim 1, wherein the first and second Ziegler-Natta type procatalysts are separately fed into the reactor.

7. The process according to claim 1, wherein a feed of the first Ziegler-Natta type procatalyst is decreased as a feed of the second Ziegler-Natta type procatalyst is increased.

8. The process of claim 7 wherein the one or more olefins comprises ethylene and further wherein a partial pressure of the ethylene is varied to maintain a constant rate of production of polyolefin.

9. The process according to claim 1, further comprising adding a continuity additive to the reactor.

10. The process according to claim 1, the second Ziegler-Natta type procatalyst has a second order productivity response to ethylene concentration.

11. The process according to claim 1, wherein the polymerization is a slurry reactor or a fluidized bed reactor.

* * * * *